United States Patent
Narita et al.

(10) Patent No.: US 11,761,391 B2
(45) Date of Patent: Sep. 19, 2023

(54) ELECTRONIC CONTROL METHOD FOR THROTTLE AND ELECTRONIC CONTROL THROTTLE DEVICE

(71) Applicant: Nikki Co., Ltd., Kanagawa-ken (JP)

(72) Inventors: Ryo Narita, Kanagawa-ken (JP); Ryuichi Oguro, Kanagawa-ken (JP)

(73) Assignee: Nikki Co., Ltd.

(*) Notice: Subject to any disclaimer, the term of this patent is extended or adjusted under 35 U.S.C. 154(b) by 0 days.

(21) Appl. No.: 17/878,904

(22) Filed: Aug. 1, 2022

(65) Prior Publication Data

US 2023/0043206 A1 Feb. 9, 2023

(51) Int. Cl.
*F02D 41/00* (2006.01)
*F02D 41/14* (2006.01)

(52) U.S. Cl.
CPC ..... *F02D 41/0002* (2013.01); *F02D 41/1401* (2013.01); *F02D 2041/1409* (2013.01); *F02D 2200/101* (2013.01); *F02D 2200/1002* (2013.01); *F02D 2200/1012* (2013.01)

(58) Field of Classification Search
CPC ........... F02D 2009/022; F02D 41/0002; F02D 41/1401; F02D 2041/1409
See application file for complete search history.

(56) References Cited

U.S. PATENT DOCUMENTS

| | | | |
|---|---|---|---|
| 5,366,039 A * | 11/1994 | Sawada | B60K 28/16 180/197 |
| 10,927,769 B2 | 2/2021 | Ino | |
| 2003/0084873 A1 * | 5/2003 | Ishida | F02D 11/105 123/399 |
| 2010/0057283 A1 * | 3/2010 | Worthing | F02D 41/1497 180/65.285 |
| 2011/0139117 A1 * | 6/2011 | Kar | F02D 11/105 123/395 |
| 2022/0307429 A1 * | 9/2022 | Sutoh | F02D 11/105 |

FOREIGN PATENT DOCUMENTS

| | | |
|---|---|---|
| JP | H05240073 A | 9/1993 |
| JP | 200838872 A | 2/2021 |

OTHER PUBLICATIONS

English abstract for JP-H05-240073.

* cited by examiner

*Primary Examiner* — Logan M Kraft
*Assistant Examiner* — Anthony L Bacon
(74) *Attorney, Agent, or Firm* — Fishman Stewart PLLC

(57) ABSTRACT

An electronic control method for a throttle performed by an electronic control throttle device is disclosed. The electronic control method includes: generating, by the electronic control section, the control signal for the throttle with a sum of a proportional torque and an integral torque as a value of a torque command, by calculating an engine speed deviation from a difference between a calculated or input engine speed and an input engine speed command; calculating an engine rotational angular acceleration based on the engine speed; obtaining the proportional torque from a product of the engine speed deviation and a predetermined coefficient; and obtaining the integral torque by integrating the product of the engine speed deviation and the predetermined coefficient.

7 Claims, 6 Drawing Sheets

ELECTRONIC CONTROL METHOD FOR THROTTLE AND ELECTRONIC CONTROL THROTTLE DEVICE

CROSS-REFERENCE TO RELATED APPLICATION

This application claims priority to Japanese Application No. JP 2021-126978 filed on Aug. 2, 2021, the contents of which are hereby incorporated by reference in its entirety.

TECHNICAL FIELD

The present invention relates to a control method for opening and closing a throttle installed in an intake system of an engine by an electronic control system, and an electronic control throttle device for performing the control method.

BACKGROUND

Conventionally, for example, JP H05-240073 discloses an electronic control throttle device that opens and closes a throttle installed in an engine intake system by an operation of an electronic control unit, which is an electronic control section, instead of mechanically opening and closing the throttle by an accelerator operation of a driver, in order to perform engine control with high accuracy for the purpose of reducing fuel consumption of a vehicle and improving traveling performance.

Further, JP 2008-38872 A discloses a control method of calculating a difference between a detected engine speed and an engine speed command (target speed) to obtain a speed deviation and driving an actuator of a throttle so as to implement a throttle operation set in advance with an appropriate value according to the amount of the deviation, in such an electronic control throttle device.

Meanwhile, in the conventional electronic control throttle device as disclosed in the above publication, in a case where a load amount in an engine operating state suddenly changes or the vehicle travels without an accelerator operation, control by the electronic control unit may not follow such a change or a difference may occur between a predicted value and an actual value in control.

In this regard, the applicant of the present application has previously invented the control method of calculating a difference between a detected engine speed and an engine speed command (target speed) to obtain a speed deviation and driving an actuator of a throttle so as to implement a throttle operation set in advance with an appropriate value according to the amount of the deviation, and has proposed the control method in Japanese Patent Application No. 2021-50322.

This electronic control throttle device performs electronic control for a throttle by obtaining a deviation between an engine speed command and an actual engine speed. As in an electronic control throttle device 1 having the configuration illustrated in FIG. 4, a speed calculation section 11 calculates an engine speed from a pulse signal from a crank pulse sensor, a speed deviation calculation section 12 calculates an engine speed deviation by subtracting the engine speed from an engine speed command, a proportional torque computation section 14 computes a proportional torque from a product of the engine speed deviation and a coefficient, an integral torque computation section 15 integrates the product of the engine speed deviation and the coefficient to obtain an integral torque, and a sum of a value of the proportional torque and a value of the integral torque is used as a torque command to request the engine. As illustrated in FIG. 5, an engine speed deviation is calculated from a difference between a calculated or input engine speed and an input engine speed command, and an engine rotational angular acceleration is calculated based on the engine speed, a proportional torque is obtained from a product of the engine speed deviation and a predetermined coefficient, and an integral torque is obtained by integrating the product of the engine speed deviation and the predetermined coefficient, and a control signal for controlling an intake air pressure with respect to the throttle is generated using a sum of the proportional torque and the integral torque as a value of a torque command.

In a control section that generates the control signal for controlling the intake air pressure with respect to the throttle, for calculation of a torque required for the engine at the time of performing idling speed control, the operating state of the engine is divided into regions by using the engine speed and the engine speed command, and appropriate calculation switching is made for each region, so that control for suppressing rotation fluctuation after the load is applied and after the load is removed is performed.

However, the region division in the conventional throttle control includes, as described below, proportional control in which the speed is divided into two regions, a region H in which the speed is higher than the speed command and a region L in which the speed is lower than the speed command, and the value of the difference between the speed command and the speed is multiplied by a proportional coefficient for each of the two divided regions H and L to derive a proportional torque, and integral control in which the value of the difference between the speed command and the speed is multiplied by an integral coefficient of each of the two divided regions H and L and the products are integrated to derive an integral torque.

Region $H$: $\omega_{ref}(K) - \omega(K) \leq 0$

Region $L$: $\omega_{ref}(K) - \omega(K) > 0$ [Expression 2]

where $\omega ref(K)$ represents the engine speed command of the K-th sample, and $\omega(K)$ represents the engine speed.

However, in such a conventional control method, as illustrated in FIG. 6, since only the region L exists after $\omega_{ref}(K) - \omega(K) > 0$, it is not possible to distinguish between a state in which the speed decreases and a state in which the speed increases, and it is not possible to perform appropriate switching of the control coefficient, as a result of which fluctuation occurs. Similarly, since only the region H exists after $\omega_{ref}(K) - \omega(K) \leq 0$, it is not possible to distinguish between the state in which the speed increases and the state in which the speed decreases, and it is not possible to perform appropriate switching of the control coefficient, as a result of which fluctuation occurs.

Therefore, it is not possible to distinguish between a case where the speed decreases from the vicinity of the speed command to a low speed range and a case where the speed increases from the low speed range to the vicinity of the speed command when the engine speed drops after applying a load such as rotating a power steering or the engine speed rises after removing the load. Similarly, it is not possible to distinguish between a case where the speed decreases from a high speed range to the vicinity of the speed command and a case where the speed increases from the vicinity of the speed command to the high speed range. Therefore, it is not possible to appropriately switch the control coefficient. In addition, when the proportional coefficient is switched discontinuously, the torque command itself is switched discontinuously, which causes a problem that a failure occurs in the operating situation.

SUMMARY

The present invention has been made in an effort to solve the above problems, and an object of the present invention is to provide a control method for causing an electronic control system to open and close a throttle installed in an intake system of an engine that suppresses a decrease in speed of the engine or an engine stall when a load is applied, for electronic control in which a proportional control coefficient and an integral control coefficient of a torque command in throttle control are changed to appropriate values depending on a region of an engine operating state to suppress rotational fluctuation of the engine speed when the load is applied and to suppress a discontinuous change in torque command due to a smoothing torque, thereby preventing a failure from occurring in an operating situation, and an electronic control throttle device for performing the control method.

According to the present invention, an electronic control method for a throttle performed by an electronic control throttle device in which an electronic control section performs control to open and close the throttle while generating a control signal based on an input data signal includes: generating, by the electronic control section, the control signal for the throttle with a sum of a proportional torque and an integral torque as a value of a torque command, by calculating an engine speed deviation from a difference between a calculated or input engine speed and an input engine speed command, calculating an engine rotational angular acceleration based on the engine speed, obtaining the proportional torque from a product of the engine speed deviation and a predetermined coefficient, and obtaining the integral torque by integrating the product of the engine speed deviation and the predetermined coefficient, in which the control signal for the throttle is generated to control an intake air pressure by changing each coefficient used for calculating the proportional torque and the integral torque appropriately for each of operating states of four regions determined according to a combination of a deviation between the calculated or input engine speed and the input engine speed command, and the engine rotational angular acceleration, and introducing a smoothing torque that suppresses a discontinuous torque change to continuously change the torque command.

In addition, in the electronic control method for a throttle according to the present invention, the operating states of the four regions may be regions A, B, C, and D divided according to the following conditions.

Region A: $\omega_{ref}(K)-\omega(K) \leq 0$ and $\omega'(K) < 0$

Region B: $\omega_{ref}(K)-\omega(K) > 0$ and $\omega'(K) < 0$

Region C: $\omega_{ref}(K)-\omega(K) \leq 0$ and $\omega'(K) \geq 0$

Region D: $\omega_{ref}(K)-\omega(K) > 0$ and $\omega'(K) \geq 0$ [Expression 3]

where $\omega_{ref}(K)$ represents the engine speed command of the K-th sample, $\omega(K)$ represents the engine speed, and $\omega'(K)$ represents the engine rotational angular acceleration.

The smoothing torque may be a product of a deviation between coefficients for calculating the proportional torque before and after a change in operating state, and the engine speed deviation.

An electronic control throttle device includes: a throttle to which an actuator is attached; and an electronic control section which performs control to open and close the throttle via the actuator while generating a control signal based on an input data signal, in which the electronic control section includes a speed deviation calculation section that calculates an engine speed deviation from a difference between an engine speed and an engine speed command, a rotational angular acceleration calculation section that calculates an engine rotational angular acceleration based on the engine speed, a proportional torque computation section that obtains a proportional torque from a product of the engine speed deviation and a predetermined coefficient, and an integral torque computation unit that obtains an integral torque by integrating the product of the engine speed deviation and the predetermined coefficient, and the electronic control throttle device performs the electronic control method for a throttle. As a result, it is possible to implement the operations and effects of the above-described control method.

The present invention suppresses rotational fluctuation of an engine speed when, for example, a load is applied, and continuously changes a torque command by a smoothing torque, thereby preventing a failure from occurring in the operating situation.

DETAILED DESCRIPTION

Figure 1:
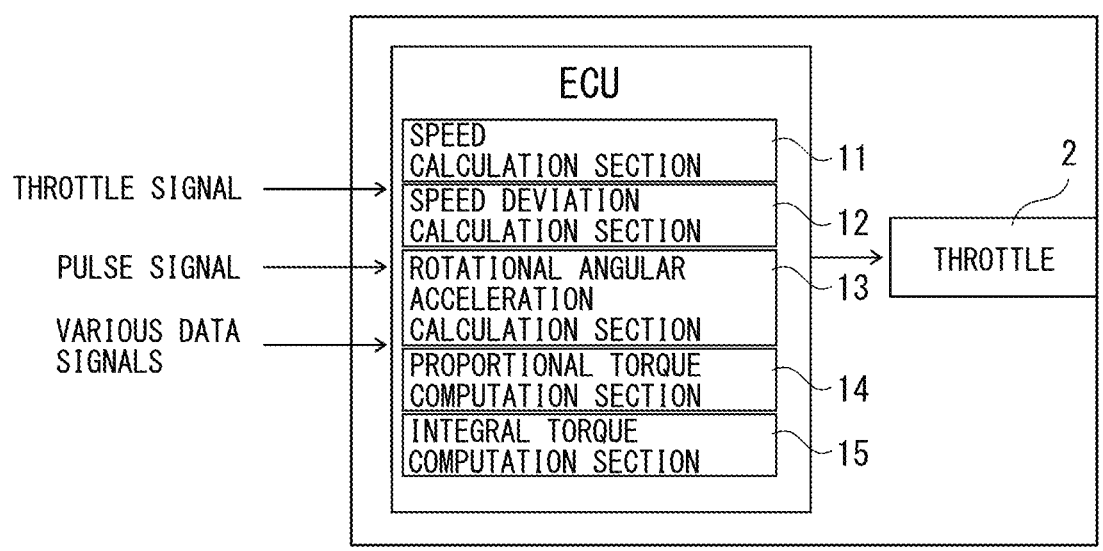
FIG. 1 is a simplified configuration diagram of an electronic control throttle device according to an embodiment of the present invention.
Figure 2:
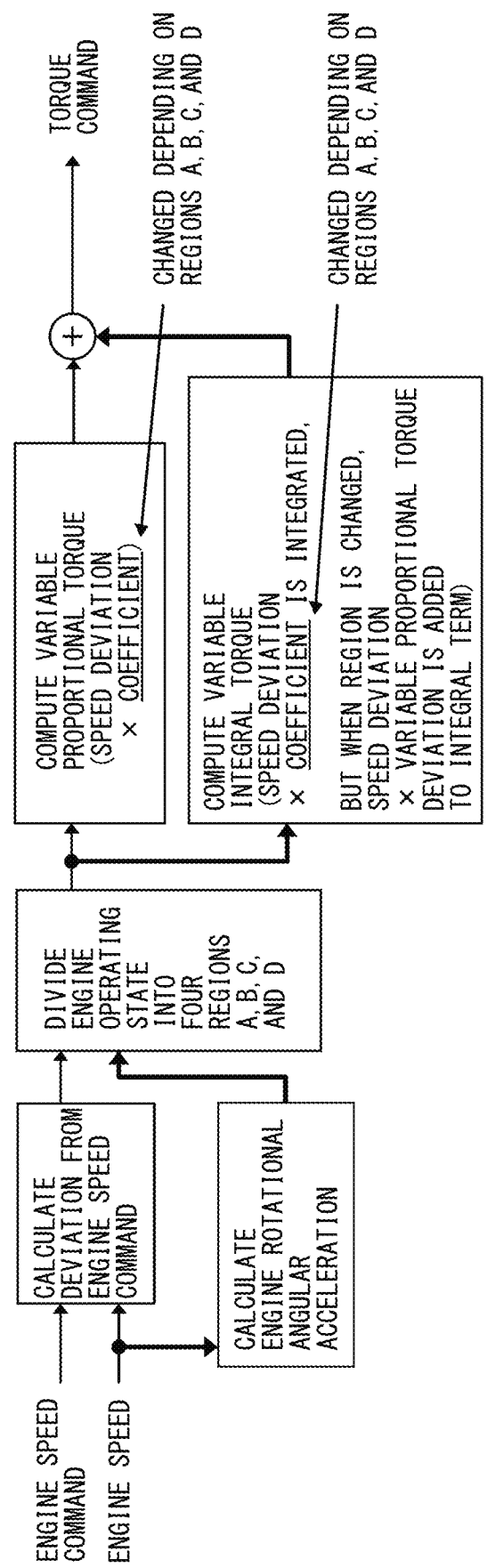
FIG. 2 is a functional block diagram illustrating control contents of the electronic control throttle device according to the embodiment illustrated in FIG. 1.
Figure 4:
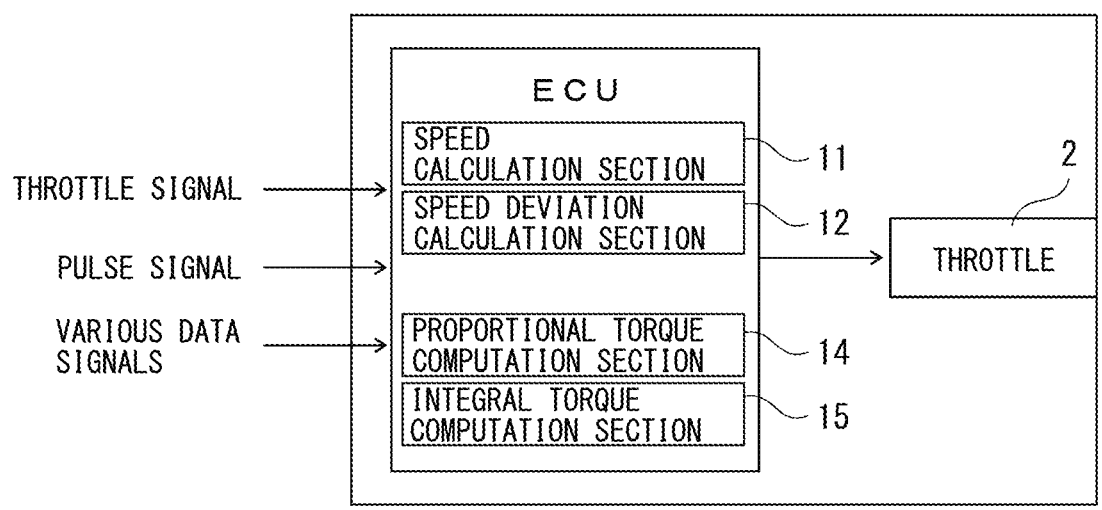
FIG. 4 is a simplified configuration diagram of a conventional electronic control throttle device.
Figure 5:
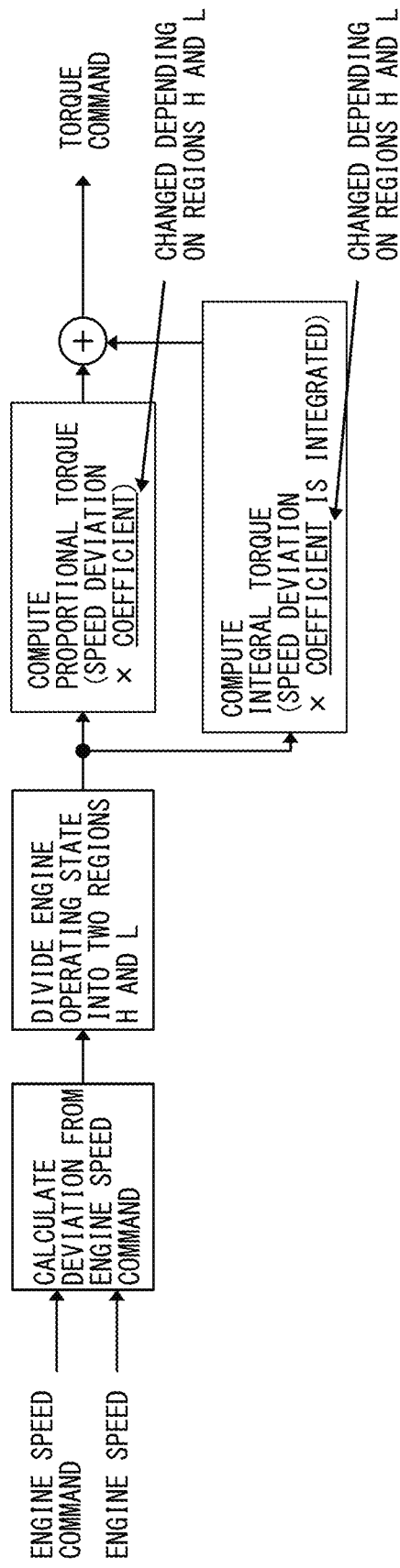
FIG. 5 is a functional block diagram illustrating control contents of the conventional electronic control throttle device illustrated in FIG. 4.

FIG. 1 schematically illustrates a functional configuration of an electronic control throttle device that performs an electronic control method for a throttle according to a preferred embodiment of the present invention. The electronic control throttle device has substantially the same configuration as the conventional electronic control throttle device illustrated in FIG. 4, and includes a throttle 2 to which an actuator (not illustrated) is attached, and an electronic control unit 1, which is an electronic control section that performs control to open and close the throttle 2. The electronic control unit 1 automatically performs control to open and close the throttle 2 while generating a control signal by a predetermined calculation method based on various data signals input thereto.

In addition, the electronic control unit 1 includes, as sections functionally configured by software stored in a storage section (not illustrated), a speed calculation section 11 that calculates an engine speed, a speed deviation calculation section 12 that calculates an engine speed deviation, a rotational angular acceleration calculation section 13 that calculates an engine rotational angular acceleration, a proportional torque computation section 14 that obtains a proportional torque, and an integral torque computation section 15 that obtains an integral torque.

Next, the control performed by the electronic control unit 1 will be described in detail with reference to FIGS. 1 and 3.

First, in the present embodiment, the speed calculation section 11 calculates the engine speed from a cycle of a pulse signal input from a crank pulse sensor (not illustrated), the speed deviation calculation section 12 calculates the engine speed deviation from a difference between the engine speed and the engine speed command (target speed), and the rotational angular acceleration calculation section 13 calculates the engine rotational angular acceleration based on the engine speed.

Then, the proportional torque computation section 14 computes a product of the engine speed deviation and a predetermined coefficient to obtain a proportional torque, and the integral torque computation section 15 performs computation of integrating a value obtained by subtracting a product of the engine rotational angular acceleration and a predetermined coefficient from the product of the engine speed deviation and a predetermined coefficient to obtain an integral torque, thereby generating a control signal for the throttle 2 using a sum of the proportional torque and the integral torque as a value of a torque command. In particular, for the contents of the control performed by the electronic control unit 1, the operating state of the engine is divided into four regions A, B, C, and D under the following conditions, and a control coefficient varies for each region to further change the configuration of an integral control system.

Region A: $\omega_{ref}(K)-\omega(K) \leq 0$ and $\omega'(K) < 0$

Region B: $\omega_{ref}(K)-\omega(K) > 0$ and $\omega'(K) < 0$

Region C: $\omega_{ref}(K)-\omega(K) \leq 0$ and $\omega'(K) \geq 0$

Region D: $\omega_{ref}(K)-\omega(K) > 0$ and $\omega'(K) \geq 0$    [Expression 4]

where ωref(K) represents the engine speed command of the K-th sample, ω(K) represents the engine speed, and ω'(K) represents the engine rotational angular acceleration.

More specifically, the engine speed command of the K-th sample is defined as $\omega_{ref}(K)$, the engine speed is defined as $\omega(K)$, the engine rotational angular acceleration is defined as $\omega'(K)$, a variable proportional coefficient used for proportional control is defined as $K_{vP}(K)$, and a variable integral coefficient used for integral control is defined as $K_{vI}(K)$, and the variable proportional coefficient $K_{vP}(K)$ and the variable integral coefficient $K_{vI}(K)$ in the regions A, B, C, and D are calculated as follows.

Region A: $K_{vP}(K)=K_{vPA}(K), K_{vI}(K)=K_{vIA}(K)$

Region B: $K_{vP}(K)=K_{vPB}(K), K_{vI}(K)=K_{vIB}(K)$

Region C: $K_{vP}(K)=K_{vPC}(K), K_{vI}(K)=K_{vIC}(K)$

Region D: $K_{vP}(K)=K_{vPD}(K), K_{vI}(K)=K_{vID}(K)$    [Expression 5]

Then, the proportional torque is defined as $Torq_{Pref}(K)$, a smoothing torque is defined as $\Delta Torq_{ref}(K)$, the integral torque is defined as $Torq_{Iref}(K)$, the torque command is defined as $Torq_{ref}(K)$, and a sampling time is defined as $T_S$, and the proportional torque, the smoothing torque, the integral torque, and the torque command are calculated by the following Expressions (1) to (4).

Next, the electronic control method for the throttle of the present embodiment will be described while comparing a graph illustrating a change in torque command indicating the electronic control method for the throttle of the present embodiment illustrated in FIG. 3 with a graph illustrating a change in torque command in a control example of the conventional electronic control throttle device illustrated in FIG. 6.

Figure 6:
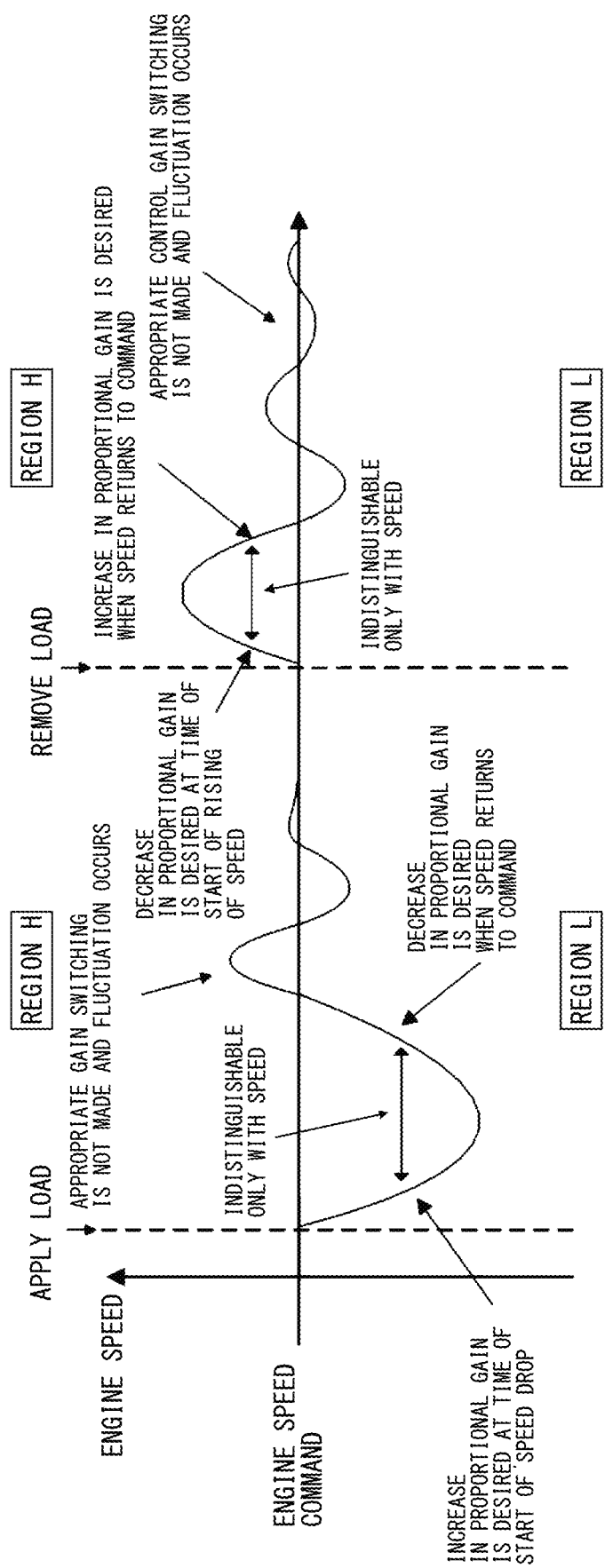
FIG. 6 is a graph illustrating a change in torque command in a control example of the conventional electronic control throttle device illustrated in FIG. 4.

Focusing on a change in engine speed until the engine speed converges to $\omega_{ref}(K)-\omega(K)=0$ after the load is applied and $\omega_{ref}(K)-\omega(K)>0$, and a change in engine speed until the engine speed converges to $\omega_{ref}(K)-\omega(K)=0$ after the load is removed and $\omega_{ref}(K)-\omega(K)\geq 0$, in a case of the conventional example illustrated in FIG. 6, only the region L exists after $\omega_{ref}(K)-\omega(K)>0$. Therefore, a state in which the engine speed decreases and a state in which the engine speed increases cannot be distinguished from each other, and appropriate switching of the control coefficient cannot be performed, as a result of which fluctuation occurs.

Figure 3:
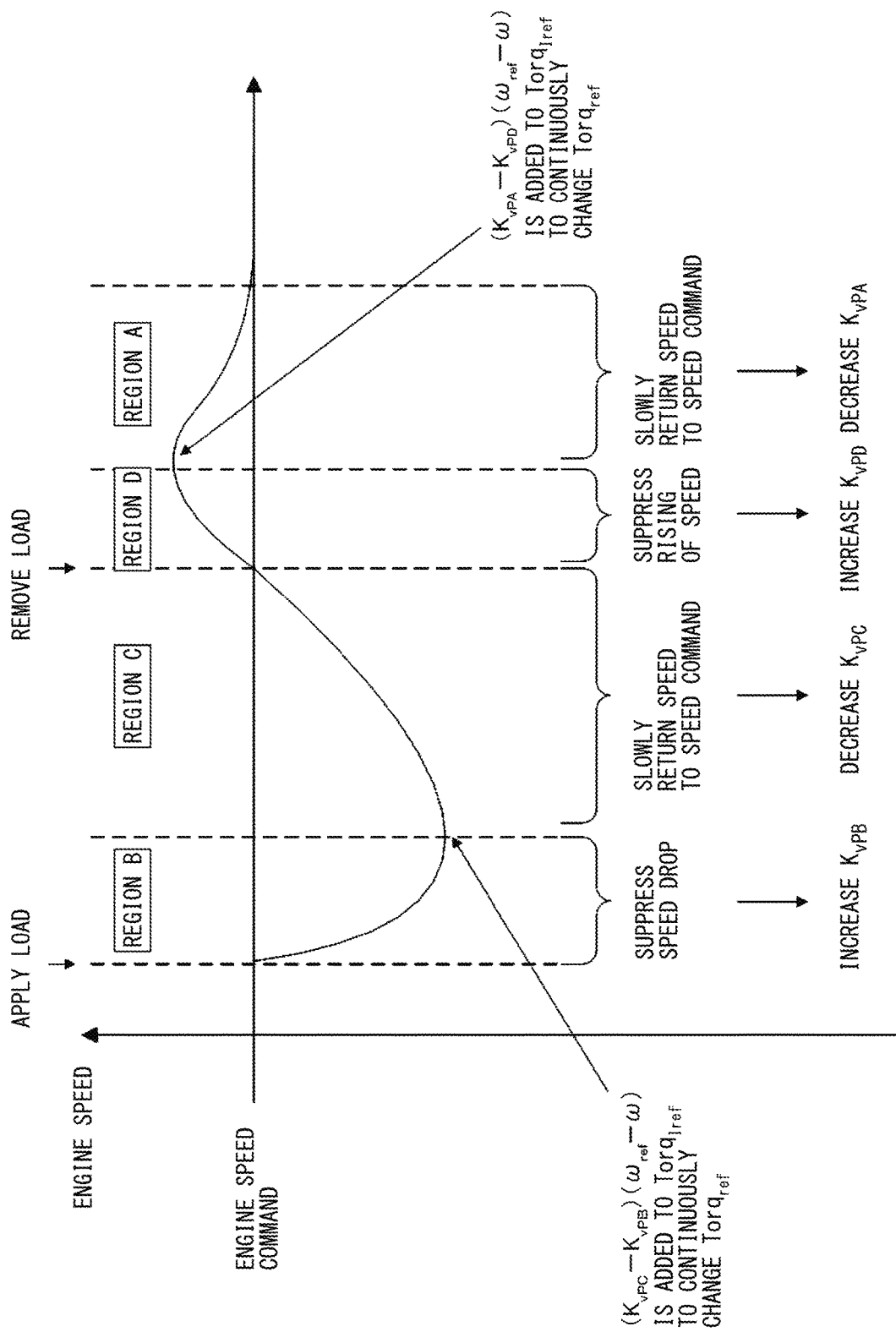
FIG. 3 is a graph illustrating a change in torque command in a control example of the electronic control throttle device of FIG. 1.

On the other hand, in the present embodiment illustrated in FIG. 3, after $\omega_{ref}(K)-\omega(K)>0$ and the operating state enters the region B, $K_{vPB}$ (the variable proportional coefficient for the region B) is increased to prevent a decrease in engine speed, and $K_{vPC}$ (the variable proportional coefficient for the region C) is decreased to make the engine speed slowly converge to $\omega_{ref}(K)-\omega(K)=0$ when the operating state enters the region C.

Similarly, also for a change in engine speed until the engine speed converges to $\omega_{ref}(K)-\omega(K)=0$ after the load is removed and $\omega_{ref}(K)-\omega(K)\leq 0$, in a case of the conventional example illustrated in FIG. 6, only the region H exists after $\omega_{ref}(K)31\ \omega(K)\leq 0$. Therefore, a state in which the engine speed increases and a state in which the engine speed decreases cannot be distinguished from each other, and appropriate switching of the control coefficient cannot be performed, as a result of which fluctuation occurs.

On the other hand, in the present embodiment illustrated in FIG. 3, after $\omega_{ref}(K)-\omega(K)\leq 0$ and the operating state enters the region D, $K_{cPD}$ (the variable proportional coefficient for the region D), which is the variable proportional coefficient for the region D, is increased to prevent rising of the engine speed, and $K_{vPA}$ (the variable proportional coefficient for the region A) is decreased to make the engine speed slowly converge to $\omega_{ref}(K)-\omega(K)=0$ when the operating state enters the region A.

Furthermore, in the present embodiment, since a difference $\{K_{vP}(K)-K_{vP}(K-1)\}\ (\omega_{ref}(K)-\omega(K))$ in torque command that has discontinuously changed at the time of region change is added to $Torq_{ref}(K)$ as $\Delta Torq_{ref}(K)$, the discontinuous change of the torque command is suppressed, and the engine speed does not fluctuate and converges to the engine speed command.

As described above, according to the present invention, it is possible to suppress the fluctuation of the engine speed when, for example, a load is applied, by changing the proportional control coefficient and the integral control coefficient of the torque command in the throttle control to appropriate values depending on the region of the engine operating state, and it is possible to prevent a failure from occurring in the operating situation by continuously changing the torque command by the smoothing torque.

What is claimed is:

1. An electronic control method for a throttle performed by an electronic control throttle device in which an electronic control section performs control to open and close the throttle while generating a control signal based on an input data signal, the electronic control method comprising:

generating, by the electronic control section, the control signal for the throttle with a sum of a proportional torque and an integral torque as a value of a torque command, by calculating an engine speed deviation from a difference between a calculated or input engine speed and an input engine speed command, calculating an engine rotational angular acceleration based on the engine speed, obtaining the proportional torque from a product of the engine speed deviation and a predetermined coefficient, and obtaining the integral torque by integrating the product of the engine speed deviation and the predetermined coefficient, wherein the control signal for the throttle is generated to control an intake air pressure by changing each coefficient used for calculating the proportional torque and the integral torque that are appropriate for each of operating states of four regions determined according to a combination of a deviation between the calculated or input engine speed and the input engine speed command, and the engine rotational angular acceleration, and introducing a smoothing torque that suppresses a discontinuous torque change to continuously change the torque command.

2. The electronic control method for a throttle according to claim 1, wherein the operating states of the four regions are regions A, B, C, and D divided according to the following conditions:

$$\text{Region } A: \omega_{ref}(K)-\omega(K)\leq 0 \text{ and } \omega'(K)<0$$

$$\text{Region } B: \omega_{ref}(K)-\omega(K)>0 \text{ and } \omega'(K)<0$$

$$\text{Region } C: \omega_{ref}(K)-\omega(K)\leq 0 \text{ and } \omega'(K)\geq 0$$

$$\text{Region } D: \omega_{ref}(K)-\omega(K)>0 \text{ and } \omega'(K)\geq 0 \quad \text{[Expression 1]}$$

where $\omega ref(K)$ represents the engine speed command of the K-th sample, $\omega(K)$ represents the engine speed, and $\omega'(K)$ represents the engine rotational angular acceleration.

3. The electronic control method for a throttle according to claim 2, wherein the smoothing torque is a product of a deviation between coefficients for calculating the proportional torque before and after a change in operating state, and the engine speed deviation.

4. The electronic control method for a throttle according to claim 1, wherein the smoothing torque is a product of a deviation between coefficients for calculating the proportional torque before and after a change in operating state, and the engine speed deviation.

5. An electronic control throttle device comprising: a throttle to which an actuator is attached; and an electronic control section which performs control to open and close the throttle via the actuator while generating a control signal based on an input data signal, wherein the electronic control section includes a speed deviation calculation section that calculates an engine speed deviation from a difference between an engine speed and an engine speed command, a rotational angular acceleration calculation section that calculates an engine rotational angular acceleration based on the engine speed, a proportional torque computation section that obtains a proportional torque from a product of the engine speed deviation and a predetermined coefficient, and an integral torque computation unit that obtains an integral torque by integrating the product of the engine speed deviation and the predetermined coefficient, wherein the electronic control throttle device is configured to generate, via the electronic control section, the control signal for the throttle with a sum of the proportional torque and the integral torque as a value of a torque command, by calculating the engine speed deviation from the difference between the engine speed and the engine speed command, calculate the engine rotational angular acceleration based on the engine speed, obtain the proportional torque from the product of the engine speed deviation and the predetermined coefficient, and obtain the integral torque by integrating the product of the engine speed deviation and the predetermined coefficient, and wherein the control signal for the throttle is generated to control an intake air pressure by changing each coefficient used for calculating the proportional torque and the integral torque that are appropriate for each of operating states of four regions determined according to a combination of a deviation between the calculated or input engine speed and the input engine speed command, and the engine rotational angular acceleration, and introducing a smoothing torque that suppresses a discontinuous torque change to continuously change the torque command.

6. The electronic control throttle device according to claim 5, wherein the operating states of the four regions are regions A, B, C, and D divided according to the following conditions:

$$\text{Region } A: \omega_{ref}(K)-\omega(K)\leq 0 \text{ and } \omega'(K)<0$$

$$\text{Region } B: \omega_{ref}(K)-\omega(K)>0 \text{ and } \omega'(K)<0$$

$$\text{Region } C: \omega_{ref}(K)-(K)\leq 0 \text{ and } \omega'(K)\geq 0$$

$$\text{Region } D: \omega_{ref}(K)-\omega(K)>0 \text{ and } \omega'(K)\geq 0 \quad \text{[Expression 1]}$$

where $\omega ref(K)$ represents the engine speed command of the K-th sample, $\omega(K)$ represents the engine speed, and $\omega'(K)$ represents the engine rotational angular acceleration.

7. The electronic control throttle device according to claim 5, wherein the smoothing torque is a product of a deviation between coefficients for calculating the proportional torque before and after a change in operating state, and the engine speed deviation.

* * * * *